(12) United States Patent
Li

(10) Patent No.: US 9,614,753 B2
(45) Date of Patent: Apr. 4, 2017

(54) METHOD AND DEVICE FOR BIDIRECTIONAL FORWARDING DETECTION UNDER CONDITION OF PARAMETER UPDATE

(71) Applicant: ZTE CORPORATION, Shenzhen, Guangdong Province (CN)

(72) Inventor: Aimin Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/420,738

(22) PCT Filed: Aug. 20, 2013

(86) PCT No.: PCT/CN2013/081877
§ 371 (c)(1),
(2) Date: Feb. 10, 2015

(87) PCT Pub. No.: WO2013/189384
PCT Pub. Date: Dec. 27, 2013

(65) Prior Publication Data
US 2015/0312139 A1 Oct. 29, 2015

(30) Foreign Application Priority Data
Dec. 19, 2012 (CN) .......................... 2012 1 0553172

(51) Int. Cl.
*H04L 12/721* (2013.01)
*H04L 12/701* (2013.01)
(Continued)

(52) U.S. Cl.
CPC .......... *H04L 45/26* (2013.01); *H04L 41/0813* (2013.01); *H04L 43/0811* (2013.01); *H04L 45/00* (2013.01)

(58) Field of Classification Search
CPC . H04L 12/2602; H04L 12/2697; H04L 41/06; H04L 41/0631; H04L 41/0654;
(Continued)

(56) References Cited

U.S. PATENT DOCUMENTS 5,630,184 A * 5/1997 Roper .................. H04L 12/1886
709/221
5,734,641 A * 3/1998 Kawasaki ............... H04L 29/06
370/235.1

(Continued)

FOREIGN PATENT DOCUMENTS

| CN | 101436924 A | 5/2009 |
| CN | 102611521 A | 7/2012 |
| CN | 103067220 A | 4/2013 |

OTHER PUBLICATIONS

Katz et al., RFC 5880: Bidirectional Forwarding Detection (BFD), Jun. 2010, Internet Engineering Task Force (IETF).*

(Continued)

*Primary Examiner* — Michael Thier
*Assistant Examiner* — Eric Nowlin
(74) *Attorney, Agent, or Firm* — Ling Wu; Stephen Yang; Ling and Yang Intellectual Property

(57) ABSTRACT

A method and device for Bidirectional Forwarding Detection under a condition of parameter update, wherein a first router establishes a link with a second router; the first router modifies packet sending parameters and/or packet receiving parameters, and sends to the second router a message with an identifier of the modification of this time; the second router returns to the first router a feedback message with an identifier of the modification of this time after receiving the message with the identifier of the modification of this time sent by the first router; the packet sending parameters and/or packet receiving parameters which are modified this time (Continued)

take effect after the first router receives the feedback message with the identifier sent by the second router.

6 Claims, 1 Drawing Sheet

(51) Int. Cl.
*H04L 12/26* (2006.01)
*H04L 12/24* (2006.01)

(58) Field of Classification Search
CPC ............. H04L 41/0659; H04L 41/0663; H04L 41/0677; H04L 41/0813; H04L 41/12; H04L 43/0811; H04L 43/0823; H04L 43/0829; H04L 43/10; H04L 43/50; H04L 45/00; H04L 45/02; H04L 45/026; H04L 45/22; H04L 45/24; H04L 45/245; H04L 45/26; H04L 45/28; H04L 45/50; H04L 45/58; H04L 45/70; H04L 69/14; H04L 69/40; H04L 2012/5625
See application file for complete search history.

(56) References Cited

U.S. PATENT DOCUMENTS

| | | | | |
|---|---|---|---|---|
| 6,778,495 B1* | 8/2004 | Blair | .................... | H04L 45/245 370/230 |
| 7,561,527 B1* | 7/2009 | Katz | .................... | H04L 12/2697 370/241 |
| 7,782,847 B2* | 8/2010 | Hua | .................... | H04L 43/0811 370/389 |
| 7,860,981 B1* | 12/2010 | Vinokour | ................ | G06F 15/16 370/241 |
| 7,957,330 B1* | 6/2011 | Bahadur | ............... | H04L 41/082 370/216 |
| 8,433,807 B2* | 4/2013 | Yang | ........................ | H04L 69/16 709/227 |
| 8,665,699 B2* | 3/2014 | Bellagamba | ........ | H04L 41/0677 370/216 |
| 8,797,886 B1* | 8/2014 | Kompella | ........... | H04L 43/0811 370/242 |
| 8,902,780 B1* | 12/2014 | Hegde | .................... | H04L 45/70 370/252 |
| 8,953,460 B1* | 2/2015 | Addepalli | ............... | H04L 43/10 370/241 |
| 9,331,923 B2* | 5/2016 | Li | .................... | H04L 43/0823 |
| 9,344,359 B1* | 5/2016 | Tiruveedhula | .......... | H04L 45/50 |
| 9,485,171 B2* | 11/2016 | Mishra | .................... | H04L 45/28 |
| 2005/0243837 A1* | 11/2005 | Boyd | .................... | H04L 45/00 370/395.52 |
| 2007/0180104 A1* | 8/2007 | Filsfils | .................... | H04L 45/02 709/224 |
| 2007/0189177 A1* | 8/2007 | Zhai | ........................ | H04L 45/10 370/244 |
| 2007/0207591 A1* | 9/2007 | Rahman | .................... | H04L 45/00 438/439 |
| 2008/0037436 A1* | 2/2008 | Liu | ...................... | H04L 12/4633 370/250 |
| 2008/0247324 A1* | 10/2008 | Nadeau | .................... | H04L 41/12 370/245 |
| 2009/0010153 A1* | 1/2009 | Filsfils | ..................... | H04L 45/02 370/218 |
| 2009/0168783 A1* | 7/2009 | Mohan | ................ | H04L 12/4633 370/395.5 |
| 2010/0023632 A1* | 1/2010 | Liu | ...................... | H04L 12/4633 709/230 |
| 2010/0246577 A1* | 9/2010 | Wu | ...................... | H04L 41/0677 370/389 |
| 2011/0134791 A1* | 6/2011 | So | ........................ | H04L 41/5009 370/253 |
| 2011/0199929 A1* | 8/2011 | Guo | ...................... | H04L 43/0852 370/252 |
| 2011/0280134 A1* | 11/2011 | Zheng | ................. | H04L 43/0811 370/241 |
| 2011/0286324 A1* | 11/2011 | Bellagamba | ........ | H04L 41/0677 370/219 |
| 2013/0028099 A1* | 1/2013 | Birajdar | .................. | H04L 45/28 370/242 |
| 2014/0029419 A1* | 1/2014 | Jain | ..................... | H04L 41/0668 370/228 |
| 2014/0307564 A1* | 10/2014 | Li | .......................... | H04L 67/141 370/242 |
| 2014/0321845 A1* | 10/2014 | Jiang | .................. | H04Q 11/0067 398/5 |
| 2015/0188814 A1* | 7/2015 | Jain | ......................... | H04L 45/74 370/392 |
| 2015/0195178 A1* | 7/2015 | Bhattacharya | ........ | H04L 45/745 718/1 |
| 2015/0236920 A1* | 8/2015 | Bevilacqua | ............. | H04L 41/12 709/224 |
| 2015/0381324 A1* | 12/2015 | Mirsky | ..................... | H04L 1/24 370/241.1 |
| 2016/0036695 A1* | 2/2016 | Mirsky | ................. | H04L 45/507 370/243 |
| 2016/0057052 A1* | 2/2016 | Zhang | ..................... | H04L 45/28 709/239 |
| 2016/0211989 A1* | 7/2016 | Jain | ..................... | H04L 12/4633 |
| 2016/0212008 A1* | 7/2016 | Jain | ..................... | H04L 12/4633 |
| 2016/0226749 A1* | 8/2016 | Rabarijaona | ........ | H04L 12/6418 |
| 2016/0294734 A1* | 10/2016 | Jang | .................... | H04L 41/0654 |

OTHER PUBLICATIONS

Bidirectional Forwarding Detection (BFD); Internet Engineering Task Force (IETF); 2070-1721; Jun. 2010; D. Katz et al. XP015070820.

Paxos (computer science)—Wikipedia, the free encyclopedia; Dec. 1, 2011, XP055209497.

* cited by examiner

METHOD AND DEVICE FOR BIDIRECTIONAL FORWARDING DETECTION UNDER CONDITION OF PARAMETER UPDATE

TECHNICAL FIELD

The present application relates to a field of communication, and especially, to a method and device for Bidirectional Forwarding Detection under a condition of parameter update.

BACKGROUND OF THE RELATED ART

Bidirectional Forwarding Detection (BFD), as a common three-layer IP detection protocol, is very extensively applied, and plays a great role in link and device monitoring and fast switching after a link failure. In the detection process, the purpose of fast detection and switching is often achieved by modifying the sending parameters and detection parameters of the packet to adapt to deployment changes of monitoring and switching applications.

However, under the condition of UP status of BFD session in current system, if one end frequently modifies the sending parameters and detection parameters of the packet simultaneously, just at this time, a system at the opposite end is busy and cannot instantly respond to a feedback message, thus, once the end which modifies parameters receives a first feedback message, it will distribute the recently modified message parameters for the Forward Plane to take effect, which may cause inconsistent negotiation of the two ends.

SUMMARY

With above remarks, embodiments of the present document provides a method and device for Bidirectional Forwarding Detection under a condition of parameter update, so as to resolve a problem of inconsistent negotiation of the two ends due to that one end frequently modifies packet sending parameters and packet receiving parameters simultaneously, but a system at the opposite end fails to instantly respond to a feedback message, and the end which modifies parameters will distribute the recently modified message parameters to the Forward Plane to take effect once receiving a first feedback message of the opposite end.

A method for Bidirectional Forwarding Detection under a condition of parameter update provided by the embodiment of the present document, comprises:

a first router establishing a link with a second router;

the first router modifying packet sending parameters and/or packet receiving parameters, and sending to the second router a message with an identifier of the modification of this time;

the second router returning to the first router a feedback message with an identifier of the modification of this time after receiving the message with the identifier of the modification of this time sent by the first router;

the packet sending parameters and/or packet receiving parameters which are modified this time taking effect after the first router receiving the feedback message with the identifier sent by the second router.

Preferably, when the first router remodifies the packet sending parameters and/or packet receiving parameters, it is determined whether a feedback message with an identifier that is corresponding to a last modification is received, if yes, a message with an identifier of a remodification is sent to the second router, if not, it is to wait for the feedback message with the identifier of the last modification.

Preferably, the identifier is a serial number.

Preferably, the serial number is configured in the message or a field of an extended authentication section of the message.

Preferably, every time the first router modifies the packet sending parameters and/or packet receiving parameters, the first router increases the corresponding serial number by one.

An embodiment of the present document further provides a device for Bidirectional Forwarding Detection under a condition of parameter update, comprising a first router and a second router which establish a link;

the first router is configured to: modify packet sending parameters and/or packet receiving parameters; and send to the second router a message with an identifier of the modification of this time; wherein packet sending parameters and/or packet receiving parameters which are modified this time take effect after the first router receives the feedback message with the identifier of the modification of this time sent by the second router;

the second router is configured to: return to the first router the feedback message with the identifier of the modification of this time after receiving the message with the identifier of the modification of this time sent by the first router.

Preferably, the first router is further configured to: determine whether a feedback message with an identifier of a last modification is received when remodifying the packet sending parameters and/or packet receiving parameters, if yes, send to the second router a message with an identifier of a remodification, if not, wait for the feedback message with the identifier of the last modification.

Preferably, the identifier is a serial number.

Preferably, the serial number is set in the message or a field of an extended authentication section of the message.

Preferably, the first router is further configured to: increase the corresponding serial number by one every time the first router modifies the packet sending parameters and/or packet receiving parameters.

Embodiments of the present document provide a method and device for Bidirectional Forwarding Detection under a condition of parameter update, when the router at one end which establishes a link modifies packet sending parameters and/or packet receiving parameters, it sends a message with an identifier of the modification of this time to its linked router; the router at the end which modifies packet sending parameters and/or packet receiving parameters cannot make the modified packet sending parameters and/or packet receiving parameters of this time take effect, until receiving a feedback message with an identifier of the modification of this time which are sent by its connected router. Through this method, a problem of inconsistent negotiation of the two ends in the related art due to that a router at one end frequently modifies packet sending parameters and packet receiving parameters simultaneously, but a system at the opposite end fails to instantly respond to a feedback message, and the end which modifies parameters will distribute the recently modified message parameters to the Forward Plane to take effect once receiving a first feedback message of the opposite end, can be effectively resolved.

PREFERRED EMBODIMENTS OF THE INVENTION

Embodiments of the present document are specific described below in combination with figures. It should be noted that, without conflicts, the embodiments in the present application and features in the embodiments may be randomly combined with each other.

In the Bidirectional Forwarding Detection (BFD), in order to reduce the impact of equipment failures on the traffics and improve usability, a device needs to detect communication failures between it and its adjacent device as soon as possible, so as to be able to take timely measures to ensure the traffics to proceed.

Embodiment 1

Figure 1:
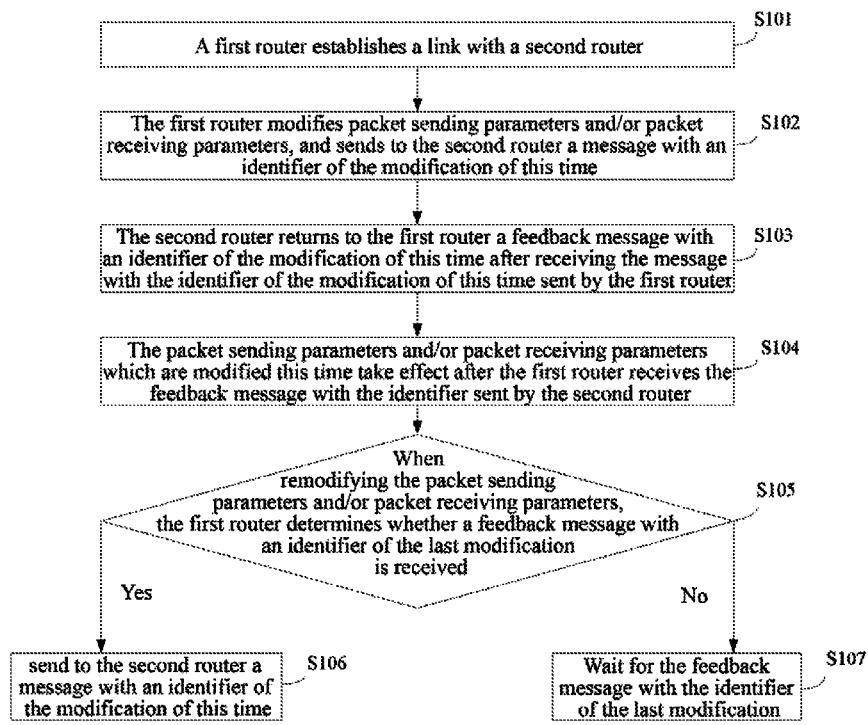
FIG. 1 is a flow diagram of a method for Bidirectional Forwarding Detection under a condition of parameter update in the embodiment 1 of the present document.

The embodiment of the present document provides a method for Bidirectional Forwarding Detection under a condition of parameter update, as seen from FIG. 1, the method comprises:

In S101, a first router establishes a link with a second router.

In S102, the first router modifies packet sending parameters and/or packet receiving parameters, and sends to the second router a message with an identifier of the modification of this time;

wherein, the identifier may be a serial number; and the serial number is set in the message or in a field of an extended authentication section of the message; every time the first router modifies the packet sending parameters and/or packet receiving parameters, the first router increases the corresponding serial number by one. If this modification is the first modification, the identifier is one.

In S103, the second router returns to the first router a feedback message with an identifier of the modification of this time after receiving the message with the identifier of the modification of this time sent by the first router.

In S104, the packet sending parameters and/or packet receiving parameters which are modified this time take effect after the first router receives the feedback message with the identifier sent by the second router.

In S105, the first router remodifies the packet sending parameters and/or packet receiving parameters, provided that this modification is the second modification, the first router determines whether a feedback message with an identifier of the last modification, i.e. the first modification, is received, if yes, it is to jump to S106; if not, it is to jump to S107.

In S106, the corresponding serial number is increased by one, and a message with an identifier (that is 2) of the modification of this time is sent to the second router.

In S107, it is to wait for the feedback message with the identifier of the last modification, i.e. the first modification.

The process of modifying packet sending parameters and/or packet receiving parameters by the second router is the same as the process of modifying packet sending parameters and/or packet receiving parameters by the first router in the embodiment of the present document. Every time the packet sending parameters and/or packet receiving parameters have been modified, the corresponding serial number is increased by one.

Embodiments of the present document provide a method for Bidirectional Forwarding Detection under a condition of parameter update, when a router at one end which establishes a link modifies packet sending parameters and/or packet receiving parameters, it sends a message with an identifier of the modification of this time to its linked router; a router at the end which modifies packet sending parameters and/or packet receiving parameters cannot make the modified packet sending parameters and/or packet receiving parameters of this time take effect, until receiving a feedback message with an identifier of the modification of this time which are sent by its connected router. Through the method, a problem of inconsistent negotiation of the two ends in the related art due to that a router at one end frequently modifies packet sending parameters and packet receiving parameters simultaneously, but a system at the opposite end fails to instantly respond to a feedback message, and the end which modifies parameters will distribute the recently modified message parameters to the Forward Plane to take effect once receiving a first feedback message of the opposite end, can be effectively resolved.

Embodiment 2

Figure 2:
FIG. 2 is a schematic diagram of a device for Bidirectional Forwarding Detection under a condition of parameter update in the embodiment 2 of the present document

An embodiment of the present document provides a device for Bidirectional Forwarding Detection under a condition of parameter update, as seen in FIG. 2, the device comprises:

a first router 21 and a second router 22 which establish a link;

the first router 21 is configured to: modify packet sending parameters and/or packet receiving parameters; and send to the second router a message with an identifier of the modification of this time, wherein packet sending parameters and/or packet receiving parameters which are modified this time take effect after the first router receives a feedback message with the identifier of the modification of this time sent by the second router; determine whether a feedback message with an identifier of the last modification is received when remodifying the packet sending parameters and/or packet receiving parameters; if yes, send to the second router a message with an identifier of the modification of this time, if not, wait for the feedback message with the identifier of the last modification, wherein every time the packet sending parameters and/or packet receiving parameters have been modified, the corresponding serial number is increased by one.

The identifier may be a serial number; and the serial number is set in the message or a field of an extended authentication section of the message.

The second router 22 is configured to: return to the first router a feedback message with an identifier of the modification of this time after receiving the message with the identifier of the modification of this time sent by the first route.

An ordinary person skilled in the field should understand that the whole or part of steps of the above-mentioned method may be implemented by a program instructing relevant hardware; the program may be stored in a computer readable storage medium such as a read-only memory, a disk or a compact disk. Alternatively, the whole or part of steps of the above-mentioned embodiments may also be implemented by using one or more integrated circuits. Correspondingly, each module/unit in the above-mentioned embodiments may be implemented in a form of hardware, or may be implemented in a form of software function module.

The present document is not limited to any specific form of the combination of hardware and software.

The above descriptions only shows preferred embodiments of the present document, while the protection scope of the present document is not limited to this, there may be various changes or replacements which can be easily conceived by any skilled in the field within the technique scope disclosed by the present document, and all these various changes or replacements should be included in the protection scope of the present document. Thus, the protection scope of the present document should be based on the protection scope in claims.

INDUSTRIAL APPLICABILITY

Through embodiments of the present document, a problem of inconsistent negotiation of the two ends in the related art due to that a router at one end frequently modifies packet sending parameters and packet receiving parameters simultaneously, but a system at the opposite end fails to instantly respond to a feedback message, and the end which modifies parameters will distribute the recently modified message parameters to the Forward Plane to take effect once receiving a first feedback message of the opposite end, can be effectively resolved.

What is claimed is:

1. A method for Bidirectional Forwarding Detection under a condition of parameter update, comprising:
   a first router establishing a link with a second router;
   the first router making a first modification to packet sending parameters and/or packet receiving parameters, and sending to the second router a first message with an identifier of the first modification;
   the second router returning to the first router a feedback message with an identifier of the first modification after receiving the first message with the identifier of the first modification sent by the first router;
   the packet sending parameters and/or packet receiving parameters which are modified in the first modification taking effect after the first router receives the feedback message with the identifier of the first modification sent by the second router;
   when the first router makes a second modification to the packet sending parameters and/or packet receiving parameters, the first router sending to the second router a second message with an identifier of the second modification, the identifier of the second modification being different from the identifier of the first modification;
   wherein the identifiers of the first and second modification are serial numbers, and every time the first router modifies the packet sending parameters and/or packet receiving parameters, the first router increases the serial number by one, the first router does not make the modified packet sending parameters and/or packet receiving parameters take effect unless the feedback message with the serial number corresponding to the first modification is received by the first router.

2. The method according to claim 1, further comprising:
after the first router makes the second modification to the packet sending parameters and/or packet receiving parameters, determining whether the feedback message with the identifier of the first modification is received, if yes, sending to the second router the second message with the identifier of the second modification, if not, waiting for the feedback message with the identifier of the first modification.

3. The method according to claim 1, wherein the serial number is set in the first and second messages or in a field of an extended authentication section of the first and second messages.

4. A device for Bidirectional Forwarding Detection under a condition of parameter update, comprising a first router and a second router which establish a link, wherein
   the first router is configured to: make a first modification to packet sending parameters and/or packet receiving parameters; and send to the second router a first message with an identifier of the first modification; wherein the packet sending parameters and/or packet receiving parameters which are modified in the first modification take effect after the first router receives a feedback message with the identifier of the first modification sent by the second router;
   the second router is configured to: return to the first router the feedback message with the identifier of the first modification after receiving the message with the identifier of the first modification sent by the first router;
   wherein the first router is further configured to: make a second modification to the packet sending parameters and/or packet receiving parameters, and send to the second router a second message with an identifier of the second modification, the identifier of the second modification being different from the identifier of the first modification;
   wherein the identifiers of the first and second modification are serial numbers, and the first router is configured to increase the serial number by one every time the first router modifies the packet sending parameters and/or packet receiving parameters, and the first router is configured to not make the modified packet sending parameters and/or packet receiving parameters take effect unless the feedback message with the serial number corresponding to the first modification is received by the first router.

5. The device according to claim 4, wherein the first router is further configured to:
   after making the second modification to the packet sending parameters and/or packet receiving parameters, determine whether the feedback message with the identifier of the first modification is received, if yes, send to the second router the second message with the identifier of the second modification, if not, wait for the feedback message with the identifier of the first modification.

6. The device according to claim 4, wherein the serial number is set in the first and second messages or in a field of an extended authentication section of the first and second messages.

* * * * *